United States Patent [19]

Satake et al.

[11] Patent Number: 5,085,819
[45] Date of Patent: Feb. 4, 1992

[54] HEAT-RESISTANT RESIN COMPOSITIONS, AND HEAT-RESISTANT MOLDED OR FORMED ARTICLES AND PRODUCTION PROCESS THEREOF

[75] Inventors: Yoshikatsu Satake; Takashi Kaneko; Yutaka Kobayashi; Yukio Ichikawa; Yo Iizuka, all of Iwaki; Makoto Fukuda, Kasukabe; Toshio Enoki, Iwaki; Katto Takayuki, Iwaki; Yasuo Sakaguchi, Iwaki; Zenya Shiiki, Iwaki, all of Japan

[73] Assignee: Kureha Kabaku Kogyo K.K., Japan

[21] Appl. No.: 354,043

[22] Filed: May 19, 1989

Related U.S. Application Data

[62] Division of Ser. No. 194,016, May 12, 1988, Pat. No. 4,895,893.

[30] Foreign Application Priority Data

May 15, 1987 [JP] Japan .................. 62-118619
May 7, 1988 [JP] Japan .................. 63-109921

[51] Int. Cl.$^5$ ............................................. B29C 45/00
[52] U.S. Cl. .................. 264/235; 264/328.16; 264/328.18
[58] Field of Search ............ 264/328.1, 328.18, 235, 264/328.4, 328.16, 328.14

[56] References Cited

U.S. PATENT DOCUMENTS

| | | | |
|---|---|---|---|
| 4,590,104 | 5/1986 | Ziener .................. | 427/389.9 |
| 4,690,972 | 9/1987 | Johnson et al. .................. | 524/609 |
| 4,698,415 | 10/1987 | Sinclair et al. .................. | 528/388 |
| 4,716,212 | 12/1987 | Gaughan .................. | 528/226 |
| 4,745,167 | 5/1988 | Iizuka et al. .................. | 526/262 |
| 4,749,598 | 6/1988 | Miles .................. | 264/141 |
| 4,785,057 | 11/1988 | Shiiki et al. .................. | 528/388 |
| 4,797,448 | 1/1989 | Liang .................. | 264/331.15 |
| 4,810,566 | 3/1989 | Kawakami et al. .................. | 264/289.6 |
| 4,810,590 | 3/1989 | Rich .................. | 264/328.18 |

FOREIGN PATENT DOCUMENTS 45-34269 8/1964 Japan .................. 264/328.18

Primary Examiner—Robert A. Dawson
Assistant Examiner—Allan R. Kuhns
Attorney, Agent, or Firm—Lowe, Price, LeBlance & Becker

[57] ABSTRACT

Heat-resistant resin composition including (A) 100 parts by weight of a poly(arylene sulfide) of a substantially linear structure containing 50% by weight or higher or recurring units of the formula

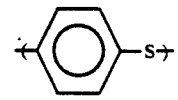

and a logarithmic viscosity number of 0.1 to 1.0 dl/g; (B) from 0.01 to less than 25 parts by weight of a melt-stable poly(arylene thioether-ketone) having predominant recurring units of the formula

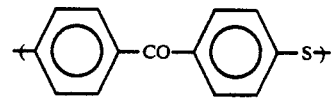

wherein the —CO— and —S— are in the para position to each other, and having a melting point of 310°–380° C., a residual melt crystallization enthalpy of at least 10 J/g, a melt crystallization temperature of at least 210° C. and a reduced viscosity of 0.2 to 2 dl/g; and (C) at least one of fibrous fibers and/or at least one of inorganic fillers in a proportion of 0 to 400 parts by weight per 100 parts by weight of the resin component including said poly(arylene sulfide) and said poly(arylene thioether-ketone). Heat-resistant articles obtained by melt-molding or forming said resin compositions and a method for the production of such articles are also described.

6 Claims, No Drawings

HEAT-RESISTANT RESIN COMPOSITIONS, AND HEAT-RESISTANT MOLDED OR FORMED ARTICLES AND PRODUCTION PROCESS THEREOF

This is a division of application Ser. No. 07/194,016, filed 5/12/88, now U.S. Pat. No. 4,895,893.

FIELD OF THE INVENTION

The present invention relates to a melt-moldable or formable poly(arylene sulfide) resin composition having heat-, oil- and wet heat-resistance as well as low gas permeability and its molded or formed article, and more particularly to a resin composition obtained by mixing a poly(arylene sulfide) having a substantially linear structure (hereinafter abbreviated as "PAS") with a melt-stable poly(arylene thioether-ketone) (hereinafter abbreviated as "PTK") and optionally, at least one of fibrous fillers and/or at least one of inorganic fillers, a heat resistant article obtained by melt-molding or forming said resin composition and a method for producing the same.

BACKGROUND OF THE INVENTION

In recent years, there has been an increasing demand for crystalline thermoplastic, heat-resistant and easily melt-processable resins in automotive, electronic and electric industries. For instance, with the spread of electronic ranges, electrical ovens and electronic oven/range combinations in domestic electrical fields, heat-resistant and electromagnetic wave-transmitting containers for foodstuffs have been much in demand. For that reason, attention has now been paid to easy-to-crystallize polyethylene terephthalate (hereinafter abbreviated as "PET") as a material capable of molding or forming heat-resistant plastic containers, e.g., thermoformed food containers which may be used with domestic electronic ranges, electrical ovens, etc. and can stand up to an oven temperature close to 200° C.

However, PET containers may be used in applications where relatively short-time heating meets the purpose, as is the case with electronic ranges, but are disadvantageous in that they are still so poor in heat resistance that they cannot withstand a high temperature of 200° C. or higher, inter alia, 220° to 230° C., in electronic ranges or electrical ovens.

Thermosetting resins such as unsaturated polyester resins or epoxy resins are moldable by the sheet molding compound (SMC) or bulk molding compound (BMC) system, and may be molded into food containers. The SMC is a sheet-like intermediate material for press molding obtained by impregnating in matted glass fibers a resin paste prepared by mixing a thermosetting resin with a filler, catalyst (a curing initiator), releasing agent, chemical thickener and the like. This sheet-like material is stored at a given temperature for a given period of time, and is designed to be molded or formed by a press at the time when the resin is semi-set or dried to the touch under the action of the thickener. The BMC is prepared by kneading together with glass fibers (chopped strands) a resin paste wherein a thermosetting resin is blended with a filler, chemical thickener, catalyst (a curing initiator), pigment, releasing agent and the like. The BMC may be molded by press molding, transfer molding, injection molding and the like. Heat-resistant food containers may be produced from thermosetting resins by such molding processes. However, food containers formed of thermosetting resins such as unsaturated polyesters are disadvantageous in that they cannot stand up to high temperatures prevailing in electronic ranges or electrical ovens due to their heat-resistant temperature being as low as about 210° C.

On the other hand, engineering plastics such as poly(arylene sulfide) (PAS) and poly(arylene thioether-ketone) (PTK) are now being developed or in practical use as thermoplastic resins excellent in heat resistance.

PAS is a thermoplastic resin used in wide fields as the engineering plastics showing excellent resistance to heat, chemicals (acids, alkalis, solvents), oils and hot water, good processability and having excellent mechanical properties. Taking advantage of its excellent properties, PAS is also used in the form of films or fibers. PAS is a crystalline resin, and is better in heat resistance than PET due to its melting point higher than that of PET. PAS is also excellent in the resistance to wet heat, solvents, etc.

There are some disclosures on PTK, for instance, German Offenlegungsschrift 34 05 523 A1, Japanese Patent Laid-Open Publication Nos. 58435/1985, 104126/1985 and 13347/1972, Indian J. Chem., 21A, pp. 501–502 (May, 1982), and Japanese Patent Laid-Open Publication No. 221229/1986. With the conventional PTK described in such publications, however, difficulty was encountered in melt molding by conventional melt molding/forming processes such as injection molding or extrusion, since it was so poor in melt stability that it lost its crystallinity or underwent a curing reaction with increases in melting viscosity during melt processing.

However, it has been found that PTK improved highly over the conventional PTK in melt stability are obtained by modifying the polymerization procedures, i.e., carrying out polymerization without adding any polymerization aid while taking into consideration the selection of a charge ratio of monomers, a shorter polymerization time at high temperatures, the selection of the material of the reactor used and the like and, optionally, conducting a stabilization treatment in a final stage of the polymerization. Such PTK is melt stable and moldable or formable by conventional melt processing (Japanese Patent Application No. 62-118619).

Incidentally, U.S. Pat. No. 4,690,972 specification discloses that PTK is added to PAS as a nucleating agent. However, said PTK is different from the said melt-stable PTK, and nowhere in that specification are heat-resistant molded or formed articles such as heat-resistant food containers disclosed.

The present inventors have made intensive studies so as to obtain heat-resistant compositions and molded or formed articles, taking advantage of the properties of PAS and melt-stable PTK as mentioned above.

In consequence, it has been found that a heat-resistant container is obtained by melt-molding or forming the melt-stable PTK alone or a thermoplastic material obtained by mixing 100 parts by weight of a thermoplastic resin such as PAS with said PTK in an amount of 25 parts by weight or more (Japanese Patent Application No. 195806/1987). This approach has however been found to involve problems such that a high melting-point PTK or a PTK-PAS composition containing the PTK in a large proportion requires a high-temperature mold in order to obtain a molded article excellent in surface characteristics and the resultant molded article is expensive due to the abundant use of the PTK more expensive compared to PAS.

OBJECTS AND SUMMARY OF THE INVENTION

An object of the present invention is to provide a heat-resistant composition and a heat-resistant molded or formed article, which overcome the drawbacks of the prior art.

Another object of the present invention is to obtain a heat-resistant molded or formed article whose thickness and filler content can be controlled freely by melt molding or forming. It is herein understood that the term "heat-resistant molded or formed article" is intended to include articles obtained by conventional processing techniques such as extrusion, injection molding, vacuum forming, stretched film forming, stretched sheet forming, electric part encapsulation and melt spinning.

A further object of the present invention is to obtain a heat-resistant food container.

The present inventors have found that a resin composition excellent in heat resistance is obtained by mixing 100 parts by weight of a poly(arylene sulfide) (PAS) of a substantially linear structure containing 50% by weight or higher of recurring units of the formula:

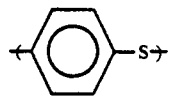

and having a logarithmic viscosity number of 0.1 to 1.0 dl/g in a 1-chloronaphthalene solution as measured at a polymer concentration of 0.4 g/dl and a temperature of 208° C. with from 0.01 to less than 25 parts by weight of a melt-stable poly(arylene thioether-ketone) (PTK) and optionally, 0 to 400 parts by weight of at least one of fibrous fillers and/or at least one of inorganic fillers, and a molded or formed article excellent in heat resistance, oil resistance and wet heat resistance and having low gas permeability is obtained by melt-molding or forming said resin composition. Such findings underlie the present invention.

More specifically, according to one aspect of the present invention, there is provided a resin composition comprising:

(A) 100 parts by weight of a poly(arylene sulfide) of a substantially linear structure containing 50% by weight or higher of recurring units of the formula:

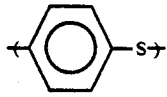

and having a logarithmic viscosity number of 0.1 to 1.0 dl/g in a 1-chloronaphthalene solution at a polymer concentration of 0.4 g/dl and a temperature of 208° C.;

(B) from 0.01 to less than 25 parts by weight of a melt-stable poly(arylene thioether-ketone) having predominant recurring units of the formula:

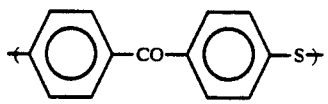

wherein the —CO— and —S— are in the para position to each other, and having the following physical properties (a)-(c):

(a) melting point, Tm being 310°-380° C.;

(b) residual melt crystallization enthalpy, ΔHmc (420° C./10 min) being at least 10 J/g, and melt crystallization temperature, Tmc (420° C./10 min) being at least 210° C., wherein ΔHmc (420° C./10 min) and Tmc (420° C./10 min) are determined by a differential scanning calorimeter at a cooling rate of 10° C./min, after poly(arylene thioether-ketone) is held at 50° C. for 5 minutes in an inert gas atmosphere, heated to 420° C. at a rate of 75° C./min, and then held at 420° C. for 10 minutes; and (c) reduced viscosity being 0.2–2 dl/g as determined by viscosity measurement at 25° C. and a polymer concentration of 0.5 g/dl in 98 wt. % sulfuric acid; and (C) at least one of fibrous fillers and/or at least one of inorganic fillers in a proportion of 0 to 400 parts by weight per 100 parts by weight of the resin component comprising said poly(arylene sulfide) and said poly(arylene thioether-ketone).

According to another aspect of the present invention, there is provided a heat-resistant molded or formed article obtained by melt-molding or forming said resin composition.

According to a further aspect of this invention, there is provided a method for the production of a heat-resistant molded article characterized by injection-molding said resin composition under the conditions of a cylinder temperature of 270° to 400° C., a mold temperature of 50° to 250° C., an injection holding pressure of 10 to 5000 kg/cm² and an injection cycle of 1 to 600 seconds and optionally, an annealing temperature of 120° to 250° C. for 10 to 600 minutes.

DETAILED DESCRIPTION OF THE INVENTION

Components of Resin Compositions

(PAS)

The PAS used in the present invention is a poly(arylene sulfide) of a substantially linear structure, which contains 50% by weight or more, preferably 70% by weight or more, more preferably 90% by weight or more of recurring units of p-phenylene sulfide:

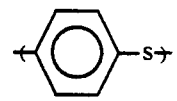

as predominant recurring units of the polymer.

It is herein understood that the "substantially linear structure" refers to polymers obtained from monomers composed mainly of substantially bifunctional monomers, rather than polymers having a crosslinked and branched structure such as those obtained by a melt-viscosity increasing treatment such as oxidation crosslinking.

Corresponding to 50% by weight or more of the p-phenylene sulfide recurring units, the PAS may contain less than 50% by weight of other constituent units.

By way of example, such constituent units may include a metaphenylene sulfide unit of the formula

a diphenylenesulfone sulfide unit of the formula

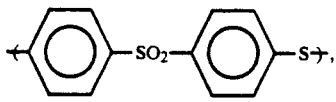

a diphenyl sulfide unit of the formula

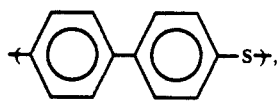

a diphenyl ether sulfide unit of the formula

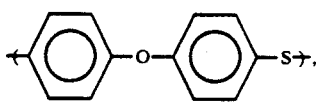

a 2,6-naphthalene sulfide unit of the formula

and a trifunctional unit of the formula

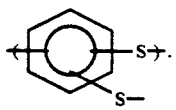

It is noted that the amount of trifunctional (tetra- or more-functional) units should preferably be not more than 1 mol %.

PAS having a high solution viscosity and a high degree of polymerization may be producing by the method described in, e.g., U.S. Pat. No. 4,645,826.

The method for the production of the PAS as described in U.S. Pat. No. 4,645,826 is to produce poly(arylene sulfides) having a melt viscosity of 1000 poise or higher (it should be noted, however, that the melt viscosity referred to in the present invention was measured at 310° C. and a shear rate of 200/sec), and involves the reaction of an alkali metal sulfide with a dihalo-aromatic compound in an organic amide solvent, which takes place at least two steps of:

(1) carrying out said reaction at a temperature of 180° to 235° C. in the presence of water in a proportion of 0.5 to 2.4 moles per mole of said alkali metal sulfide, thereby forming a poly(arylene sulfide) having a melt viscosity of 5 to 300 poise at a conversion of 50 to 98 mol % with respect to said dihalo-aromatic compound, and (2) continuing said reaction, while adding water to the reaction system in such a way that 2.5 to 7.0 moles of water is present per mole of said alkali metal sulfide and increasing the temperature of the reaction system to the range of 245° to 290° C.

Use may preferably be made of block copolymers composed mainly of the p-phenylene sulfide recurring units of the formula

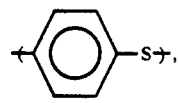

for instance, block copolymers containing 70 to 95 mole % of recurring units of the formula

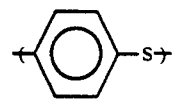

and 5 to 30 mole % of metaphenylene sulfide recurring units of the formula

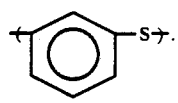

Such block copolymers having a high melt viscosity may be produced by the method described in, e.g., EPC No. 166451-A.

The PAS used in the present invention is of the chemical structure as stated above, and has its solution viscosity expressed in terms of a logarithmic viscosity number of 0.1 to 1.0 dl/g, preferably 0.25 to 0.9 dl/g in a 1-chloronaphthalene solution as measured at a polymer concentration of 0.4 g/dl and a temperature of 208° C. A polymer having a melt viscosity as low as a logarithmic viscosity number of below 0.1 is unpreferred, since it may be melt-molded or formed, but the resulting product becomes mechanically fragile. On the other hand, a polymer having a logarithmic viscosity number exceeding 1.0 is again unpreferred due to its poor processability.

In accordance with heat-resistant resin compositions and molded or formed articles of the present invention, the melt-stable PTK and, optionally at least one of fibrous fillers and/or at least one of inorganic fillers are added to the PAS with a view to modifying/improving the physical properties that the heat-resistant resin PAS possess (for instance, mechanical, electrical, thermal, chemical and like properties), modifying/improving the processability thereof and cutting down the cost thereof.

Melt-Stable PTK

The melt-stable PTK used in the present invention is a poly(arylene thioether-ketone) (PTK) having predominant recurring units of the formula

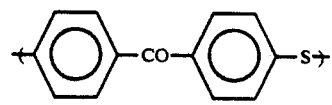

wherein the —CO— and —S— are in the para position to each other. In order to be a heat-resistant polymer, the PTK used in the present invention should preferably contain said recurring units in a proportion of 50% by weight or higher, preferably 60% by weight or higher and more preferably 70% by weight or higher. A polymer containing said recurring units in a proportion of below 50% by weight is likely to be low in crystallinity and hence has poor heat resistance.

Exemplary recurring units other than the above recurring units of the formula may include:

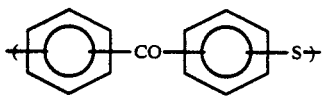

(except for the recurring unit in which the —CO— and —S— are in the para position to each other.);

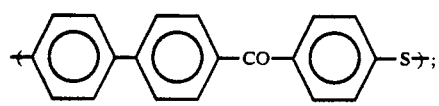

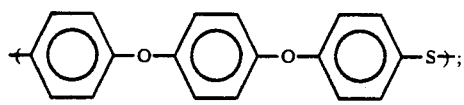

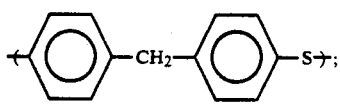

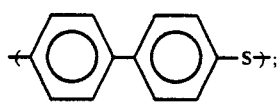

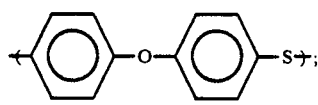

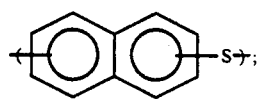

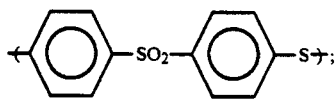

and

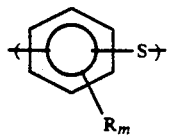

(wherein R means an alkyl group having 5 or less carbon atoms and m stands for an integer of 0-4.).

It is desirable that the melt-stable PTKs employed in this invention are uncured polymers, especially, uncured linear polymers. The term "cure" as used herein means a molecular-weight increasing treatment by a method other than a usual polycondensation reaction, for example, by a crosslinking, branching or molecular-chain extending reaction, particularly, a molecular-weight increasing treatment by a high-temperature heat treatment or the like. By the term "uncured polymer" as used herein, is meant a polymer which has not been subjected to a post treatment such that curing is applied to increase the molecular weight of the polymer and hence to increase its melt viscosity. In general, "curing" causes a PTK to lose or decrease its melt stability and crystallinity.

PTK, into which some crosslinked and/or branched structure is introduced within such limits that its melt stability, flowability and crystallinity are not degraded, may be used as the blending resin in the present invention. For instance, a PTK obtained by carrying out polymerization with the use of a small amount of a crosslinking agent (e.g., polychlorobenzophenone, polybromobenzophenone or the like) or a PTK subjected to mild curing are allowable as PTK used in the present invention.

Physical Properties of PTK

The PTK used in the present invention should preferably possess the following physical properties.

(a) The melting point, Tm should range from 310° to 380° C.

(b) The residual melt crystallization enthalpy, $\Delta Hmc$ (420° C./10 min) should be at least 10 J/g, and the melt crystallization temperature, Tmc (420° C./10 min) should be at least 210° C.

(c) The reduced viscosity, $\eta_{red}$ should be 0.2 to 2 dl/g. In the present invention, it is understood that the reduced viscosity, $\eta_{red}$ is expressed in terms of a value as measured at 25° C. and a polymer concentration of 0.5 g/dl in 98 wt. % sulfuric acid.

(d) As an index indicating the properties of crystallinity, the density in the crystallized form when PTK is annealed at 280° C. for 30 minutes should be at least 1.34 g/cm$^3$ (at 25° C.). A PTK having a reduced viscosity exceeding 2 dl/g is difficult to be prepared or melt molded, while a PTK having a reduced viscosity of below 0.2 dl/g is unpreferred, since it is likely that the mechanical properties of compositions of the PAS mixed with such PTK are poor.

The properties of the PTK used in the present invention will be described in more detail.

(1) Heat Resistance

The melting point, Tm serves as an index of the heat resistance of a polymer.

The PTK used in the present invention has a melting point, Tm of 310° to 380° C., preferably 320° to 375° C., more preferably 330° to 370° C. PTK having a Tm of below 310° C. is unpreferred due to its insufficient heat resistance, while the PTK having a Tm exceeding 380° C. is undesired since difficulty is experienced in melt-processing it without decomposition.

(2) Melt Stability

The greatest feature of the PTK resin used in the present invention is that it has a melt stability sufficient to permit the application of conventional melt processing techniques.

The conventional PTK are all poor in melt stability, so that they tend to decrease in flowability or lose their crystallinity or to undergo crosslinking or carbonization, resulting an abrupt increase in melt viscosity during melt processing.

It is hence possible to obtain an index of the melt processability of the PTK by investigating the residual crystallinity of the PTK after holding it at a temperature equal to or higher than the melt processing temperature for a certain period of time. The residual crystallinity can be evaluated quantitatively in terms of melt crystallization enthalpy. Specifically, the residual melt crystallization enthalpy, $\Delta Hmc$ (420° C./10 min) and melt crystallization temperature, $Tmc$ (420° C./10 min) are determined by a differential scanning calorimeter at a cooling rate of 10° C./min after the PTK is held at 50° C. for 5 minutes in an inert gas atmosphere, heated to 420° C. at a rate of 75° C./min, and then held at 420° C. for 10 minutes. PTK, poor in melt stability, undergoes crosslinking or the like under the above high-temperature condition of 420° C. and loses its crystallinity substantially.

The melt-stable PTK used in the present invention is a polymer which has a $\Delta Hmc$ (420° C./10 min) of at least 10 J/g, more preferably at least 15 J/g, most preferably at least 20 J/g and a $Tmc$ (420° C./10 min) of at least 210° C., more preferably at least 220° C., most preferably 230° C.

PTK having a $\Delta Hmc$ (420° C./10 min) of lower than 10 J/g or a $Tmc$ (420° C./10 min) of below 210° C. tends to lose its crystallinity or induces a melt viscosity increase during melt processing, so that difficulty is encountered in the application of conventional melt processing techniques.

(3) Molecular Weight

The molecular weight of the PTK correlating with the melt viscosity is an important factor which governs its melt processability. Reduced viscosity, $\eta_{red}$ is used as an index of molecular weight.

It is desired that the PTK suitable for melt processing be a high-molecular weight PTK having a reduced viscosity, $\eta_{red}$ of 0.2 to 2 dl/g, more preferably 0.3 to 2 dl/g, most preferably 0.5 to 2 dl/g.

(4) Crystallinity

Density is used as an index of crystallinity of a polymer.

It is desired that the PTK used in the present invention be a polymer having a density at 25° C. of at least 1.34 g/cm$^3$, more preferably at least 1.35 g/cm$^3$, as measured in the crystallized form by annealing it at 280° C. for 30 minutes. In the case of PTK having a density of below 1.34 g/cm$^3$, it is likely that its heat resistance may be insufficient due to its low crystallinity, and the physical properties of molded or formed articles obtained from the PAS resin compositions containing it may drop.

Production Process of the PTK

The PTK used in the present invention may be produced, for instance, by subjecting an alkali metal sulfide and a dihalo-aromatic compound, preferably, dichlorobenzophenone and/or dibromobenzophenone to a dehalogenation and sulfuration reaction, for a short period of time, in the substantial absence of any polymerization aid (a slat of a carboxylic acid or the like), in an aprotic polar organic solvent, preferably, an organic amide solvent (including a carbamic amide or the like) and in a system having a water content much higher compared with the polymerization processes of the prior art while suitably controlling the temperature, and optionally, by choosing the material of a reactor.

Specifically, the melt-stable PTK used in the present invention can suitably be produced by polymerizing an alkali metal sulfide and a dihalo-aromatic compound consisting principally of 4,4'-dichlorobenzophenone and/or 4,4'-dibromobenzophenone by a dehalogenation and sulfuration reaction under the following conditions (a)-(c) in an organic amide solvent:

(a) The ratio of the water content to the amount of the organic amide solvent charged should be in a range of 2.5 to 15 (moles/kg);

(b) The ratio of the amount of the dihalo-aromatic compound charged to the amount of the alkali metal sulfide charged should be in a range of 0.95 to 1.2 (moles/moles); and (c) The reaction should take place at a temperature ranging from 60° to 300° C. with a proviso that the reaction time at 210° C. or higher be limited to within 10 hours.

The melt-stable PTK can more suitably be obtained, when the reactor, or at least a portion of which being brought into contact with the reaction mixture is made of a corrosion-resistant material such as a titanium material.

The PTK having further improved melt stability can be obtained by adding a halogen-substituted aromatic compound to the alkali metal sulfide, said halogen-substituted aromatic compound has at least one substituent group having electron withdrawing property at least equal to a —CO— group (preferably 4,4'-dichlorobenzophenone and/or 4,4'-dibromobenzophenone employed as the monomer) for further reaction in a final stage of the polymerization.

Proportion of the PTK to be Blended

The proportion of the melt-stable PTK to be used and blended with 100 parts by weight of the PAS according to the present invention is from 0.01 to less than 25 parts by weight, preferably 0.1 to 24 parts by weight. At an amount smaller than 0.01 part by weight, the PTK does not sufficiently function as the blending resin (or does not sufficiently take advantage of its physical properties). Addition of more than 25 parts by weight does not improve the nucleating effect so much compared with addition of less than 25 parts by weight. For good economy and effect of the PTK an amount exceeding 25 parts by weight is not beneficial.

When the PAS compositions wherein the proportion of the melt-stable PTK blended with the PAS falls within the scope of the present invention, it is possible to obtain the PAS molded or formed products suitable for various types of processing and excellent in heat resistance, since their crystallization rate is increased, while a fine spherulithic structure is formed.

Fibrous Filler and Inorganic Filler

Any fibrous fillers that can be incorporated into food containers are applicable to the present invention, and may include fibers such as glass, carbon, graphite, silica, alumina, zirconia, silicon carbide and Aramid fibers; as well as whiskers such as calcium silicate (including wollastonite), calcium sulfate, carbon, silicon nitride and boron whiskers, by way of example. Of these fibers, particular preference is given to glass fibers, carbon fibers and Aramid fibers from the viewpoints of physical properties. The inorganic fillers used may include, e.g., talc, mica, kaolin, clay, silica, alumina, silica-alumina, titanium oxide, zirconium oxide, calcium carbonate, calcium silicate, calcium phosphate, calcium sulfate, magnesium carbonate, magnesium phosphate, carbon (including carbon black), graphite, silicon nitride, glass hydrotalcite, etc., all in the powdery form.

In the present invention, one or more of such fillers may be blended at need. The fibrous fillers and inorganic fillers may be used alone or in combination.

The fibrous filler and/or inorganic filler used in the present invention should be blended in a proportion of 0 to 400 parts by weight, preferably 0.1 to 300 parts by weight, more preferably 1 to 200 parts by weight with respect to 100 parts by weight of the resin component comprising a mixture of PAS and the melt-stable PTK. The proportion of the filler or fillers exceeding 400 parts by weight is unpreferred, since there is a fear that processability may deteriorate. It is understood that a small amount of the filler or fillers tends to lower the heat distortion temperature of the molded or formed articles under load, as compared with those containing a larger amount of the filler or fillers.

The PAS resin compositions of the present invention may optionally be added with auxiliary additives such as photostabilizers, rust preventives, lubricants, surface-roughening agents, nucleating agents, releasing agents, colorants, coupling agents, flash preventives, antistatic agents and so on.

Molded or Formed Articles

Molded or formed articles obtainable from the PAS resin compositions of the present invention should possess the following physical properties (a)–(b).

(a) The heat distortion temperature, as measured under a load of 18.6 kg/cm$^2$ according to ASTM D-648, should be at least 220° C., preferably at least 230° C., more preferably at least 250° C.

(b) The flexural strength, as measured at 200° C. (according to ASTM D-790), should be at least 2 kg/mm$^2$, preferably at least 3 kg/mm$^2$, or the flexural modulus, as measured at 200° C. (according to ASTM D-790), should be at least 100 kg/mm$^2$, preferably at least 150 kg/mm$^2$, more preferably at least 200 kg/mm$^2$.

Since the molded articles of the present invention excel in heat resistance, and possess high mechanical strength, satisfactory chemical resistance and hot water resistance and low gas permeability, they are valuable in various application fields inclusive of industrial, medical, foodstuff and general goods fields where heat resistance is required.

When molded articles having a heat distortion temperature of below 220° C., a flexural strength of below 2 kg/mm$^2$ at 200° C. and a flexural modulus of below 100 kg/mm$^2$ at 200° C. are used for food containers, by way of example, there is a fear that they may be deformed either in the course of cooking in an electronic oven range or on their removal after the completion of cooling.

The resin compositions of the present invention can be molded or formed into from thin- to thick-walled containers for foodstuffs, usually in the order of about 0.1 to 10 mm thick-walled containers.

Molding or Forming Method

The PAS resin compositions of the present invention may be molded or formed into articles by conventional melt processing (extrusion, injection molding, etc.). In particular, the PAS resin compositions of the present invention is preferably molded by injection molding in view of facilitation. Alternatively, the resin compositions may be extruded into sheet-like or tubular articles or fibers, which are in turn subjected to post-forming, stretching, crystallization and so on.

Injection Molding

The PAS resin composition of the present invention is supplied to an injection molding machine provided with a mold for thin-walled articles in the air or a non-oxidizing atmosphere, and is injection-molded under the molding conditions of a cylinder temperature of 270° to 400° C., preferably 290° to 360° C., a mold temperature of 50° to 250° C., preferably 120° to 180° C. and an injection holding pressure of 10 to 5000 kg/cm$^2$, preferably 50 to 3000 kg/cm$^2$ and an injection molding cycle of 1 to 600 seconds, preferably 3 to 120 seconds, optionally, followed by annealing at a temperature of 120° to 250° C., preferably 150° to 210° C. for 10 to 600 minutes, preferably 20 to 240 minutes, whereby the heat-resistant molded article of the present invention can be produced.

Cylinder temperatures lower than 270° C. or higher than 400° C. are unpreferred, since the lower temperatures make the flow of the resin compositions difficult, while the higher temperatures tend to cause the thermal decomposition of the resin compositions. Mold temperatures lower than 50° C. or higher than 250° C. are unpreferred, since the lower temperatures tend to cause the molded articles to be roughened on their surfaces, while the higher temperatures make the solidification of the molded articles difficult. Injection holding pressure lower than about 10 kg/cm$^2$ are unpreferred, since the filling of the resin in the mold tends to become incomplete. Excessively high injection holding pressures are also unpreferred, since difficulty is experienced in reducing the flashing of the molded articles. An extremely short injection molding cycle is unpreferred, since the solidification of the resin in the mold tends to become insufficient. An extremely long injection molding cycle is also unpreferred, since the residence time of the polymer in the injection machine is so extended that the polymer may possibly be discolored or degraded. If the mean residence time of the resin in the cylinder is below 1 second, then it is likely that the melting of the resin may become incomplete. If a residence time of resin in the cylinder exceeds 600 seconds, then it is likely that the resin may be decomposed.

Preferably, the injection molding machine used in the present invention has its portion, in contact with a resin melt, formed of a nonferrous corrosion-resistant material, and is provided with a vent.

The heat-resistant PAS resin compositions used in the present invention may be in the form of either powders or pellets. It is preferred, however, that they are in the form of pellets, since their steady supply to the molding machine is facilitated.

Application Fields

The heat-resistant resin compositions and molded articles according to the present invention may find use in wide application fields in which heat resistance is demanded. In particular, the heat-resistant molded articles according to the present invention can suitably be used as food containers for cooking with electronic ranges, electronic oven ranges, etc. Besides, they can be used in various forms including stretched films, unstretched films, sheets, fibers, tubular articles and encapsulants for electronic parts.

ADVANTAGES OF THE INVENTION

The resin compositions and molded or formed articles according to the present invention excel in mechanical properties as well as the resistance to heat, chemicals, wet heat and oils. For instance, if such compositions are molded or formed into food containers, it is then possible to obtain containers which can be used for cooking needing extended heating in electronic oven ranges, etc. According to the present invention, it is also possible to obtain from thin- to relatively thick-walled formed articles in the form of stretched/unstretched films, sheets, fibers, tubular articles and encapsulants for electronic parts, by way of example. In addition, fillers may freely be incorporated into the present compositions and articles, and conventional melt processing techniques may suitably be applied for molding or forming.

EMBODIMENTS OF THE INVENTION

The present invention will be described specifically with reference to the following Examples and Experimental Examples. It should however be borne in mind that the scope of the present invention is not limited to the following Examples.

Synthesis of the PAS

Synthesis of poly(p-phenylene sulfide) (PPPS)

Synthesis Experiment 1

A titanium-lined polymerization reactor was charged with 370 kg of hydrated sodium sulfide (water content: 53.6 wt %) and 800 kg of N-methylpyrrolidone (NMP), which were slowly heated to 203° C. in a nitrogen gas atmosphere, while distilling off a solution of NMP containing 144 kg of water. Subsequently, 4 kg of water were added to the reactor, and a mixed solution of 320 kg of p-dichlorobenzene (PDCB) with 280 kg of NMP was then supplied to the reactor. Polymerization reaction was carried out for 4 hours at 220° C. Further, 110 kg of water were added (under pressure) to the reactor, and the contents were heated to 260° C. to continue polymerization reaction for 5 hours. After cooling, the reaction solution was sieved through a 0.1-mm mesh screen to separate a granular polymer, which was then washed with methanol and water. Next, the polymer was treated in a 2% aqueous solution of ammonium chloride at 40° C. for 30 minutes, followed by water washing and drying. The polymer was found to have a melt viscosity of 1410 poise (as measured at 310° C. and a shear rate of 1200/sec) and an $\eta_{inh}$ of 0.33 dl/g (as measured at a polymer concentration of 0.4 g/dl and a temperature of 208° C.).

Synthesis Experiment 2

A titanium-lined polymerization reactor was charged with 11.0 kg of NMP and 3.39 kg of hydrated sodium sulfide (water content: 53.6 wt. %), which were gradually heated to 200° C. in a nitrogen gas atmosphere to distill off water and some NMP (the content of water remained in the reactor being 0.47 kg).

Next, 2.955 kg of PDCB dissolved in 3.0 kg of NMP was added into the reactor, and was held at 215° C. for 3 hours. Further, 0.97 kg of water was added under pressure into the reactor and polymerization was continued at 255° C. for 0.5 hour. By florescent X-ray analysis, the formed p-phenylene sulfide polymer was found to have a mean degree of polymerization of 190.

A 20-liter pressure-resistant titanium-lined polymerization reactor was charged with 2.2 kg of NMP and 0.68 kg of hydrated sodium sulfide (water content: 53.6 wt. %), which was slowly heated to 200° C. in a nitrogen gas atmosphere to distill off water and some NMP (the content of water remained in the reactor being 0.10 kg). m-Dichlorobenzene (0.59 kg) was mixed with 0.6 kg of NMP. The NMP solution of m-dichlorobenzene, 80% by weight of the total amount of the said reaction mixture, 0.38 kg of water was charged into the reactor and polymerization was carried out at 255° C. for 2 hours. After the reaction, the obtained reaction product was diluted about twice with NMP and filtered to separate a solid matter, which was washed four times with hot water and then dried at 80° C. to obtain a polymer (p-phenylene sulfide block copolymer with the mean degree of polymerization of

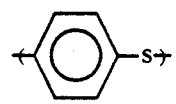

blocks being 190).

Infrared spectrophotometric analysis of the composition of the obtained polymer indicated that it consisted of 82 mol % of the

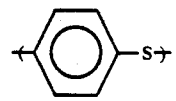

component and 18 mol % of the

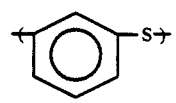

component. The $\eta_{inh}$ and melt viscosity were 0.24 dl/g (at a polymer concentration of 0.4 g/dl and a temperature of 208° C.) and 580 poise (at 310° C. and a shear rate of 1200/sec), respectively, while the Tg and Tm were 73° C. and 278° C., respectively.

Tg and Tm were measured on a differential scanning calorimeter.

Synthesis of the PTK

Synthesis Experiment 3

Melt-Stable PTK

A titanium-lined polymerization reactor was charged with 90 moles of 4,4'-dichlorobenzophenone (manufactured by Ihara Chemical Industry Co., Ltd.), 90 moles of hydrated sodium sulfide (water content: 53.6 wt. % and manufactured by Sankyo Kasei Co., Ltd.) and 90 kg of NMP (water content/NMP=5.0 moles/kg). After the reactor being purged with nitrogen gas, the mixture was heated from room temperature to 240° C. over 1.5 hours and then maintained for 0.9 hour. While a mixture of 5.0 moles of 4,4'-dichlorobenzophenone, 20 kg of NMP and 100 moles of water was charged into the reactor under pressure, the reaction mixture was heated to 260° C. over 0.5 hour and maintained for further 1.0 hour for reaction.

The polymerization reactor was cooled, and the reaction slurry was charged into about 200 liters of acetone and filter out a polymer, which was then washed three times each with acetone and water, each in three portions. Acetone and water were removed to obtain the polymer in a wet state, which was in turn dried under reduced pressure at 70° C. for 12 hours, thereby obtaining Polymer A as an ivory powder.

Synthesis Experiment 4

Conventional PTK

A polymerization reactor made of SUS 316 was charged with 1.0 mole of sodium sulfide trihydrate, 800 ml of NMP and 1.0 g of sodium hydroxide, and the mixture solution was heated to 210° C. to distill off 42 g of water solution containing 3 g of NMP and were thereafter cooled down to about 45° C. Under vigorous stirring, 1.0 mole of 4,4'-difluorobenzophenone and 0.033 mole of sodium sulfite were added into the reactor (water content/NMP=0.9 mole/kg). The reaction system was pressurized to 5 atm with nitrogen gas, and was maintained at 250° C. for 4 hours for polymerization. After the reaction, the polymerization reactor was cooled down to 100° C., and the reaction mixture was taken out. The resulting polymer was separated from that mixture, and was repeatedly washed with hot water and acetone. After sufficient wash of the polymer, it was fully dried to obtain Polymer B-1 as a yellowish brown powder.

Synthesis Experiment 5

Preparation of PTK Described in U.S. Pat. No. 4,690,972

A polymerization reactor made of SUS 316 was charged with 2.08 moles of sodium hydrosulfide hydrate (water content: 31.9 wt. %), 2 moles of sodium hydroxide and 1200 ml of NMP, which were heated to 205° C. in a nitrogen gas stream to distill off 33.9 g of a liquid containing 5.6 g (5.5 ml) of NMP.

Thereafter, the reaction system was cooled down to 120° C., and a mixed solution of 2 moles of 4,4'-dichlorobenzophenone and 1205.5 ml of NMP was added thereto (water content/NMP=0.6 mole/kg). Polymerization was carried out at 265° C. for 3.5 hours under pressure in the presence of nitrogen.

After the reaction, the reaction slurry was poured into water and repeatedly washed with water and acetone. Subsequent drying gave Polymer B-2 as a brown powder.

Measurement of Melting Point

The melting point, Tm was measured in the following manner. About 10 mg of PTK (powder) was first weighed. On a differential scanning calorimeter (Model TC10A manufactured Mettler Company), the sample was held at 50° C. for 5 minutes in an inert gas atmosphere and then heated at a rate of 10° C./min to determine its melting point.

As a result, Polymer A was found to have Tm of 360° C. Polymers B-1 and B-2 were found to have their Tm's ranging from 350° to 380° C.

Measurement of Residual Melt Crystallization Enthalpy and Melt Crystallization Temperature Residual melt crystallization enthalpy, $\Delta Hmc$ (420° C./10 min) and melt crystallization temperature, Tmc (420° C./10 min) were measured as an index of melt stability. Namely, about 10 mg of PTK (powder) was first weighed. The sample was held at 50° C. for 5 minutes in an inert gas atmosphere, heated to 420° C. at a rate of 75° C./min, held at that temperature for 10 minutes, and was cooled down at a rate of 10° C./min on a differential scanning calorimeter, whereby $\Delta Hmc$ (420° C./10 min) and Tmc (420° C./10 min) were measured.

As a result, Polymer A was found to show a $\Delta Hmc$ of 59 (J/g) and a Tmc of 306° C. Both Polymers B-1 and B-2 were zero in terms of $\Delta Hmc$, and were unmeasurable in terms of Tmc.

Measurement of Density and Solution Viscosity

Density was measured as an index of crystallinity. First of all, PTK (powder) was placed between two polyamide films ("Kapton"—trade mark —manufactured by Du Pont de Nemours & Co., Inc.). It was preheated at 385° C. for 2 minutes and pressed at that temperature for 0.5 minute for shaping with the use of a hot press. The product was quenched to prepare an amorphous sheet of about 0.15 mm in thickness. One part of the amorphous sheet was used directly as a sample, while another part was annealed at 280° C. for 30 minutes to prepare an annealed sample having an increased crystallinity. The density was measured at 25° C. by means of a density gradient tube (lithium bromide/water).

With respect to each PTK, the solution viscosity (reduced viscosity, $\eta_{red}$) was measured as an index of its molecular weight. More specifically, each PTK sample was dissolved in 98 wt. % sulfuric acid to a polymer concentration of 0.5 g/dl, and was measured by means of a Ubbellohde viscometer. As a result, Polymer A was found to show a density (g/cm$^3$) of 1.30 for the amorphous sample and 1.35 for the annealed sample and have a reduced viscosity of 0.61 dl/g. Both Polymers B-1 and B-2 underwent local foaming during melt processing and showed variations in density ranging from 1.28 to 1.30 for the amorphous samples and 1.30 to 1.31 for the annealed samples.

It is found from the results that Polymer A, that is the melt-stable PTK according to the present invention, is of high density and high crystallinity and shows a density of 1.34 g/cm$^3$ or higher for the annealed sample, while Polymers B-1 and B-2, that are PTK according to the prior art, undergo crosslinking accompanied by local foaming during the melt processing, so that the density and crystallinity of the obtained sheets are limited to low levels.

Measurement of Crystallization Rate

The half-crystallization time, $\tau_{\frac{1}{2}}$ was determined according to the known method [e.g., "Kobunshi Kagaku", 25, 155 (1968)] with the use of DSC 7 manufactured by Perkin Elmer Co., Ltd.

The conditions for measurement are as follows.

About five milligrams of a quenched pressed-sheet test piece of each sample was melted at 340° C. for 1 minute in a nitrogen gas stream, and was thereafter rapidly cooled down to the predetermined crystallization temperature, at which an isothermal crystallization curve is obtained. The time, $\tau_{\frac{1}{2}}$ needed for the crystallization of a half of a crystallizable component is calculated using that curve.

Shorter half-crystallization time, $\tau_{\frac{1}{2}}$ means a higher crystallization rate.

Measurement of Spherulite Size

A sheet obtained by heating and melting a polymer or polymer blend under pressure and quenching it was melted at 340° C. for 1 minute, and was thereafter rapidly cooled down to 250° C., at which it was isothermally crystallized. At the time when growing spherulites collided with each other, the size of the spherulites was measured under a polarized microscope equipped with a heater/cooler.

EXAMPLES 1–3

Using a tumbler blender, the PTK obtained in Synthesis Experiment 3 in the form of powder and glass fibers (GF) of chopped strands of 3 mm in length and 13 μm in diameter were mixed with the PPPS obtained in Synthesis Experiment 1, each in an amount of 100 parts by weight, in the proportions specified in Table 1, thereby obtaining blends.

Each blend was supplied to a twin-screw extruder including a cylinder having a diameter of 35 mm and a length of 1 m and equipped with a nozzle having three holes whose diameters were 4 mm each and was melt-extruded in a strand form at a cylinder temperature of 320° C. for a residence time in the cylinder of about 3 minutes. The strands were quenched and cut to obtain strand-cut pellets.

Each pellet sample was supplied to an injection molding machine (having a vent and working at a mold clamping pressure of 75 tons) equipped with a mold for food contains, and was injection-molded under the conditions of a cylinder temperature of 320° C., a mold temperature of 150° C., an injection holding pressure of 1000 kg/cm$^2$, an injection molding cycle of about 40 seconds and a residence time in the cylinder of about 1 minute, thereby obtaining a food container, which was then annealed at 200° C. for 4 hours. The food containers were found to have a thickness of 1 mm.

In order to measure the physical properties of the molded articles, the mold was replaced by a mold for the preparation of test pieces to be measured as regards their physical properties, and the test pieces (annealed pieces) were prepared from the pellets in the same manner as described in connection with the preparation of the food containers.

The blend formulation and physical properties of the test pieces thus molded are set out in Table 1.

A beef paste was filled in each of the thus-prepared food containers, and was cooked in an electronic oven range while controlling a heater voltage in such a manner that the upper and bottom temperatures of the container ranged from about 220° to 230° C. After 25 minutes, the container was removed from the oven to observe its state of distortion. The results are set out in Table 1.

COMPARATIVE EXAMPLES 1–2

Molded articles were obtained in a similar manner as above, except that the PPPS and PTK respectively obtained in Synthesis Experiments 1 and 3 were independently used as the resins, and glass fibers were blended together in the proportions specified in Table 1. It should be borne in mind, however, that the PTK was pelletized by melt-extruding it in a strand form at a cylinder temperature of 370° to 380° C. for about 3 minutes of a residence time in the cylinder, followed by quenching and cutting, and that the PTK was molded into food containers by supplying it to an injection molding machine equipped with the aforesaid mold for food containers and injection-molding it under the molding conditions of a cylinder temperature of 375° C., a mold temperature of 180° C., an injection holding pressure of 1000 kg/cm$^2$, an injection molding cycle of about 40 seconds and a residence time in the cylinder of about 1 minute. The molded containers were annealed at 280° C. for 4 hours.

COMPARATIVE EXAMPLES 3–4

Added to 100 parts by weight of the PPPS obtained in Synthesis Experiment 1 were 10 parts by weight of the PTK obtained in a similar manner as described in Synthesis Experiment 4 and, as was the case with Example 2, 74 parts by weight of glass fibers were added to the product to obtain a composition. A similar composition was separately obtained with 10 parts by weight of the PTK obtained in a similar manner as described in Synthesis Experiment 5.

Obtained from the compositions were pellets, test pieces and molded articles (containers) in a similar manner as described in the foregoing examples. The obtained brown pellets were all found to contain considerable bubbles and show noticeable variations in color.

The containers underwent no distortion, but was inferior in releasability to the molded article of Example 2. The physical properties of the products obtained form these compositions are also set out in Table 1.

EXAMPLE 4

One hundred parts by weight of the PPPS obtained in Synthesis Experiment 2 and 1.0 part by weight of calcium carbonate were uniformly blended together by means of a Henschel mixer. Then, 5 parts by weight of the PTKf obtained by Synthesis Experiment 3 and glass fibers (GF) of chopped strands having a length of 3 mm and a diameter of 13 μm were added to and mixed with the blend by means of a tumbler blender to obtain a blend. A molded article was obtained from this blend in the same manner as described in the foregoing examples.

The physical properties of the molded article are set out in Table 1.

From Table 1, it is evident that the heat-resistant containers according to the examples of the present invention excel in not only heat resistance but also mechanical strength. As will be clearly understood from the fact that the half-crystallization time, $\tau_{\frac{1}{2}}$ is short, the crystallization rate of the resin compositions according to the present invention are so high that their moldability are improved.

TABLE 1

|  | Example 1 | Example 2 | Example 3 | Example 4 |
|---|---|---|---|---|
| Blending formulation |  |  |  |  |
| PPPS |  |  |  |  |
| (kind) | Syn. Exp. 1 | Syn. Exp. 1 | Syn. Exp. 1 | Syn. Exp. 2 |
| (wt. parts) | 100 | 100 | 100 | 100 |
| PTK |  |  |  |  |
| (kind) | Syn. Exp. 3 | Syn. Exp. 3 | Syn. Exp. 3 | Syn. Exp. 3 |

TABLE 1-continued

|  |  |  |  |  |
|---|---|---|---|---|
| (wt. parts) | 0.1 | 10 | 24 | 5 |
| Glass fibers* (wt. parts) | 67 | 74 | 83 | 56 |
| CaCO$_3$** (wt. parts) | 0 | 0 | 0 | 1 |
| Properties of test pieces |  |  |  |  |
| Heat distortion temp. (°C.) ASTM D-648 Load: 18.6 kg/cm$^2$ | 270 | 272 | 275 | 260 |
| Flexural strength at 200° C. (kg/mm$^2$) | 5.5 | 6.0 | 6.5 | 4.5 |
| Flexural strength at 200° C. (kg/mm$^2$) | 320 | 335 | 350 | 312 |
| Heat distortion of container 250° C. $\tau\frac{1}{2}$ (sec) | No distortion 100 | No distortion 26 | No distortion 25 | No distortion 68 |

|  | Comp. Ex. 1 | Comp. Ex. 2 | Comp. Ex. 3 | Comp. Ex. 4 |
|---|---|---|---|---|
| Blending formulation |  |  |  |  |
| PPPS |  |  |  |  |
| (kind) | Syn. Exp. 1 |  | Syn. Exp. 1 | Syn. Exp. 1 |
| (wt. parts) | 100 | 0 | 100 | 100 |
| PTK |  |  |  |  |
| (kind) |  | Syn. Exp. 3 | Syn. Exp. 4 | Syn. Exp. 5 |
| (wt. parts) | 0 | 100 | 10 | 10 |
| Glass fibers* (wt. parts) | 67 | 67 | 74 | 74 |
| CaCO$_3$** (wt. parts) | 0 | 0 | 0 | 0 |
| Properties of test pieces |  |  |  |  |
| Heat distortion temp. (°C.) ASTM D-648 Load: 18.6 kg/cm$^2$ | 270 | 340< | 271 | 271 |
| Flexural strength at 200° C. (kg/mm$^2$) | 5.5 | 11 | 5.7 | 5.8 |
| Flexural strength at 200° C. (kg/mm$^2$) | 320 | 680 | 330 | 332 |
| Heat distortion of container 250° C. $\tau\frac{1}{2}$ (sec) | No distortion 185 | No distortion Unmeasurable | No distortion 41 | No distortion 43 |

*Glass fibers: "03T-717/p", trade name; 3 mm chopped strands; product of Nippon Electric Glass Co., Ltd.
**CaCO$_3$: "CCR", trade name; product of Shiraishi Calcium Kaisha, Ltd.

EXAMPLE 5

A polymerization reactor was charged with 42.4 kg of hydrated sodium sulfide (water content: 53.6 wt. %) and 100 kg of NMP. The mixture was heated to about 190° C. to distill off a solution of NMP containing 15 kg of water. Then, 40.9 kg of p-dichlorobenzene was charged, followed by polymerization at 220° C. for 5 hours. Next, 7.7 kg of water was charged into the reactor, and the temperature was increased to 260° C., followed by polymerization for 3 hours.

A polymer was sieved out of the reaction solution, washed with methanol, water, 2% ammonium chloride and water respectively and dried to obtain PPPS, which was found to have a logarithmic viscosity number of 0.12 dl/g.

One part by weight of the PTK obtained in Synthesis Experiment 3 was added to and mixed with 100 parts by weight of the PPPS in a Henschel mixer, and the mixture was extruded into pellets through an extruder ("BT-30", trade name; manufactured by Plavor Co., Ltd.).

The results of examination of the compositions consisting of the PPPS alone and the PPPS with the PTK are as set out in Table 2.

TABLE 2

| Blending formulation (pars by weight) |  | $\tau\frac{1}{2}$ at 250° C. (sec) | Spherulite size (μm) |
|---|---|---|---|
| Comp. Ex. 3 | PPPS alone | 610 | 170 |
| Ex. 5 | PPPS 100/PTK 1 | 12 | 8 |

As shown in Table 2, the composition of the present invention had a high crystallization rate and a small spherulite size, and was uniform.

We claim:

1. A method for the production of a heat-resistant article, comprising injection-molding a resin composition using a cylinder temperature of 270° to 400° C., a mold temperature of 50° to 250° C., an injection holding pressure of 10 to 5000 kg/cm$^2$ and an injection molding cycle of 1 to 600 seconds and optionally, annealing the thus-molded product at 120° to 250° C. for 10 to 600 minutes, said resin composition formed by mixing:

(A) 100 parts by weight of a poly(arylene sulfide) of a substantially linear structure containing 50% by weight or higher of recurring units of the formula:

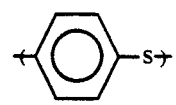

and having a logarithmic viscosity number of 0.1 to 1.0 dl/g in a 1-chloronaphthalene solution at a polymer solution of 0.4 g/dl and a temperature of 208° C.;

(B) from a lower limit of 0.01 to an upper limit of less than 25 parts by weight of a melt-stable poly(arylene thioether-ketone) having predominant recurring units of the formula:

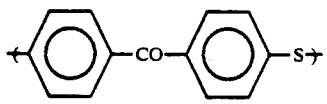

wherein the —CO— and —S— are in the para position to each other, and having the following physical properties (a)-(c):

(a) melting point, Tm being 310°-380° C.;

(b) residual melt crystallization enthalpy, $\Delta$Hmc (420° C./10 min) being at least 10 J/g, and melt crystallization temperature, Tmc (420° C./10 min) being at least 210° C., wherein $\Delta$Hmc (420° C./10 min) and Tmc (420° C./10 min) are determined by a differential scanning calorimeter at a cooling rate of 10° C./min after the poly(arylene thioether-ketone) is held at 50° C. for 5 minutes in an inert gas atmosphere, heated to 420° C. at a rate of 75° C./min, and then held at 420° C. for 10 minutes; and (c) reduced viscosity being 0.2 to 2 dl/g as determined by viscosity measurement at 25° C. and a polymer concentration of 0.5 g/dl in 98 wt. % sulfuric acid; and (C) at least one filler selectedf from the group consisting of fibrous fillers and inorganic nonfibrous fillers in a proportion of 0 to 400 parts by weight per 100 parts by weight of said poly(arylene sulfide) and said poly(arylene thioether-ketone).

2. The method as claimed in claim 1, wherein said heat-resistant molded article has the following physical properties (a) and (b):

(a) heat distortion temperature being at least 220° C. under a load of 18.6 kg/cm$^2$, and (b) flexural strength being at least 2 kg/mm$^2$ at 200° C., or flexural modulus being at least 100 kg/mm$^2$ at 200° C.

3. The method as claimed in claim 1, wherein said poly(arylene sulfide) is a block copolymer consisting of 70 to 95 mol % of recurring units of the formula:

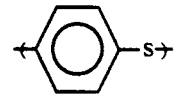

and 5 to 30 mol % of recurring units of the formula:

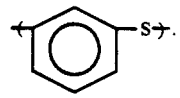

4. The method as claimed in claim 1, wherein the density of said poly(arylene thioether-ketone) is at least 1.34 g/cm$^3$ at 25° C. when annealed at 280° C. for 30 minutes.

5. The method as claimed in claim 1, wherein said poly(arylene thioether-ketone) is an uncured polymer.

6. The method as claimed in claim 1, wherein said heat-resistant molded article is a heat-resistant food container.

* * * * *

UNITED STATES PATENT AND TRADEMARK OFFICE
CERTIFICATE OF CORRECTION

PATENT NO. : 5,085,819

DATED : February 4, 1992

INVENTOR(S) : Satake et al

It is certified that error appears in the above-identified patent and that said Letters Patent is hereby corrected as shown below:

IN THE TITLE PAGE:

At [75] Inventors, line 5, change "Katto Takayuki" to --Takayuki Katto--.

Signed and Sealed this

Eighth Day of June, 1993

Attest:

MICHAEL K. KIRK

Attesting Officer

Acting Commissioner of Patents and Trademarks